US007809223B2

(12) United States Patent
Miyabe et al.

(10) Patent No.: US 7,809,223 B2
(45) Date of Patent: Oct. 5, 2010

(54) POLARIZATION-MAINTAINING OPTICAL FIBER, METHOD OF MANUFACTURING POLARIZATION-MAINTAINING OPTICAL-FIBER CONNECTING PORTION, AND POLARIZATION-MAINTAINING OPTICAL-FIBER CONNECTING PORTION

(75) Inventors: Ryo Miyabe, Tokyo (JP); Yu Mimura, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 0 days.

(21) Appl. No.: 12/169,182

(22) Filed: Jul. 8, 2008

(65) Prior Publication Data
US 2008/0292251 A1 Nov. 27, 2008

Related U.S. Application Data

(63) Continuation of application No. PCT/JP2007/063915, filed on Jul. 12, 2007.

(60) Provisional application No. 60/830,099, filed on Jul. 12, 2006, provisional application No. 60/830,098, filed on Jul. 12, 2006.

(51) Int. Cl.
*G02B 6/024* (2006.01)
*G02B 6/255* (2006.01)

(52) U.S. Cl. ............... 385/123; 385/96; 385/125

(58) Field of Classification Search ............ None
See application file for complete search history.

(56) References Cited

U.S. PATENT DOCUMENTS 4,603,943 A  8/1986  Okoshi

| 5,581,647 | A  * | 12/1996 | Onishi et al. | 385/123 |
|---|---|---|---|---|
| 5,615,295 | A  * | 3/1997 | Yoshida et al. | 385/123 |
| 6,836,605 | B2 * | 12/2004 | Hirano et al. | 385/123 |
| 7,085,464 | B2 | 8/2006 | Miyabe et al. | |
| 7,164,830 | B2 | 1/2007 | Hiroishi et al. | |
| 7,376,316 | B2 * | 5/2008 | Sasaki et al. | 385/123 |
| 2004/0258379 | A1 | 12/2004 | Berkey et al. | |
| 2005/0147367 | A1* | 7/2005 | Shimada et al. | 385/123 |
| 2006/0045446 | A1* | 3/2006 | Berkey et al. | 385/123 |
| 2006/0213230 | A1 | 9/2006 | Miyabe et al. | |
| 2007/0177846 | A1* | 8/2007 | Chen et al. | 385/125 |
| 2008/0124036 | A1 | 5/2008 | Miyabe et al. | |
| 2008/0159704 | A1 | 7/2008 | Miyabe et al. | |

FOREIGN PATENT DOCUMENTS

| JP | 58-188604 | 12/1983 |
| JP | 59-7905 A | 1/1984 |
| JP | 61-146725 A | 7/1986 |

(Continued)

OTHER PUBLICATIONS

T. Okoshi et al. Side-tunnel fibre: an approach to polarisation-maintaining optical waveguide scheme. Electronics Letters, 18:19:824-826, Sep. 1982.*
U.S. Appl. No. 12/406,483, filed Mar. 18, 2009, Miyabe, et al.

*Primary Examiner*—Mike Stahl
(74) *Attorney, Agent, or Firm*—Oblon, Spivak, McClelland, Maier & Neustadt, L.L.P.

(57) ABSTRACT

A polarization-maintaining optical fiber includes a core region and a cladding region formed around the core region. The cladding region has a refractive index lower than a refractive index of the core region. A refractive index profile of the core region is either one of a step shaped or a concave shaped. The cladding region includes two holes formed in such a manner that a shortest distance from the core region is virtually zero at locations in opposite to each other across the core region.

18 Claims, 11 Drawing Sheets

FOREIGN PATENT DOCUMENTS

| | | |
|---|---|---|
| JP | 61-267707 | 11/1986 |
| JP | 4-67106 A * | 3/1992 |
| JP | 2004-264405 A | 9/2004 |
| WO | WO 2004/113978 A1 | 12/2004 |

* cited by examiner

| α | LEAKAGE LOSS |
|---|---|
|  | dB/km |
| 2 | 0.094 |
| 3 | 0.011 |
| 3.5 | 0.0028 |
| 4 | 0.0013 |
| 4.5 | 0.00053 |

FIG.10

| | Δ11 | α1 | a1 | HOLE DIAMETER | MODE BIREFRINGENCE | CUTOFF WAVELENGTH | MACRO-BENDING LOSS (r=10 mm) | LEAKAGE LOSS |
|---|---|---|---|---|---|---|---|---|
| | % | | μm | μm | | nm | dB/m@1.55 μm | dB/km@1.55 μm |
| SECOND EMBODIMENT EXAMPLE | 0.34 | 8 | 8 | 25 | $1.12 \times 10^{-4}$ | 1140 | 50 | 0.0025 |
| THIRD EMBODIMENT EXAMPLE | 0.47 | 3.5 | 8 | 25 | $1.13 \times 10^{-4}$ | 1290 | 0.05 | <0.001 |
| FOURTH EMBODIMENT EXAMPLE | 0.42 | 6 | 7.6 | 20 | $1.4 \times 10^{-4}$ | 1150 | 16 | <0.001 |
| FIFTH EMBODIMENT EXAMPLE | 0.51 | 5 | 7.6 | 20 | $1.41 \times 10^{-4}$ | 1290 | 0.02 | <0.001 |
| SIXTH EMBODIMENT EXAMPLE | 0.49 | 8 | 7 | 25 | $1.68 \times 10^{-4}$ | 1150 | 2.87 | 0.002 |
| SEVENTH EMBODIMENT EXAMPLE | 0.55 | 6 | 7 | 25 | $1.69 \times 10^{-4}$ | 1220 | 0.643 | <0.001 |
| EIGHTH EMBODIMENT EXAMPLE | 0.5 | 8 | 6.5 | 25 | $2.16 \times 10^{-4}$ | 1080 | 40 | <0.001 |
| NINTH EMBODIMENT EXAMPLE | 0.6 | 10 | 6.5 | 22 | $2.17 \times 10^{-4}$ | 1190 | 0.095 | <0.001 |
| TENTH EMBODIMENT EXAMPLE | 0.6 | 10 | 6 | 25 | $2.81 \times 10^{-4}$ | 1100 | 8.9 | <0.001 |
| ELEVENTH EMBODIMENT EXAMPLE | 0.7 | 8 | 6 | 25 | $2.81 \times 10^{-4}$ | 1175 | 0.007 | <0.001 |
| TWELFTH EMBODIMENT EXAMPLE | 0.75 | 10 | 6 | 25 | $2.82 \times 10^{-4}$ | 1220 | <0.001 | <0.001 |
| THIRTEENTH EMBODIMENT EXAMPLE | 0.75 | 6 | 5.5 | 10 | $3.22 \times 10^{-4}$ | 1150 | 0.11 | <0.001 |
| FOURTEENTH EMBODIMENT EXAMPLE | 0.85 | 6 | 5.5 | 10 | $3.32 \times 10^{-4}$ | 1230 | <0.001 | <0.001 |

FIG.13

| | Δ21 | Δ22 | α2 | a21 | a22 | HOLE DIAMETER | MODE BIREFRINGENCE | CUTOFF WAVELENGTH | MACRO-BENDING LOSS (r=10 mm) | LEAKAGE LOSS |
|---|---|---|---|---|---|---|---|---|---|---|
| | % | % | | μm | μm | μm | | nm | dB/m@1.55μm | dB/km@1.55μm |
| FIFTEENTH EMBODIMENT EXAMPLE | 0.47 | 0.51 | 8 | 5 | 7.6 | 20 | $1.37 \times 10^{-4}$ | 1275 | 0.226 | <0.001 |
| SIXTEENTH EMBODIMENT EXAMPLE | 0.5 | 0.6 | 10 | 4 | 6.5 | 22 | $2.13 \times 10^{-4}$ | 1160 | 7.8 | 0.0048 |
| SEVENTEENTH EMBODIMENT EXAMPLE | 0.6 | 0.7 | 8 | 4 | 6 | 25 | $2.75 \times 10^{-4}$ | 1150 | 1.35 | 0.0014 |
| EIGHTEENTH EMBODIMENT EXAMPLE | 0.6 | 0.7 | 8 | 3 | 6 | 25 | $2.76 \times 10^{-4}$ | 1170 | 0.73 | <0.001 |
| NINETEENTH EMBODIMENT EXAMPLE | 0.65 | 0.75 | 8 | 4 | 5.5 | 10 | $3.18 \times 10^{-4}$ | 1120 | 0.3 | <0.001 |
| TWENTIETH EMBODIMENT EXAMPLE | 0.8 | 0.85 | 3.5 | 4 | 5.5 | 10 | $3.28 \times 10^{-4}$ | 1210 | <0.001 | <0.001 |

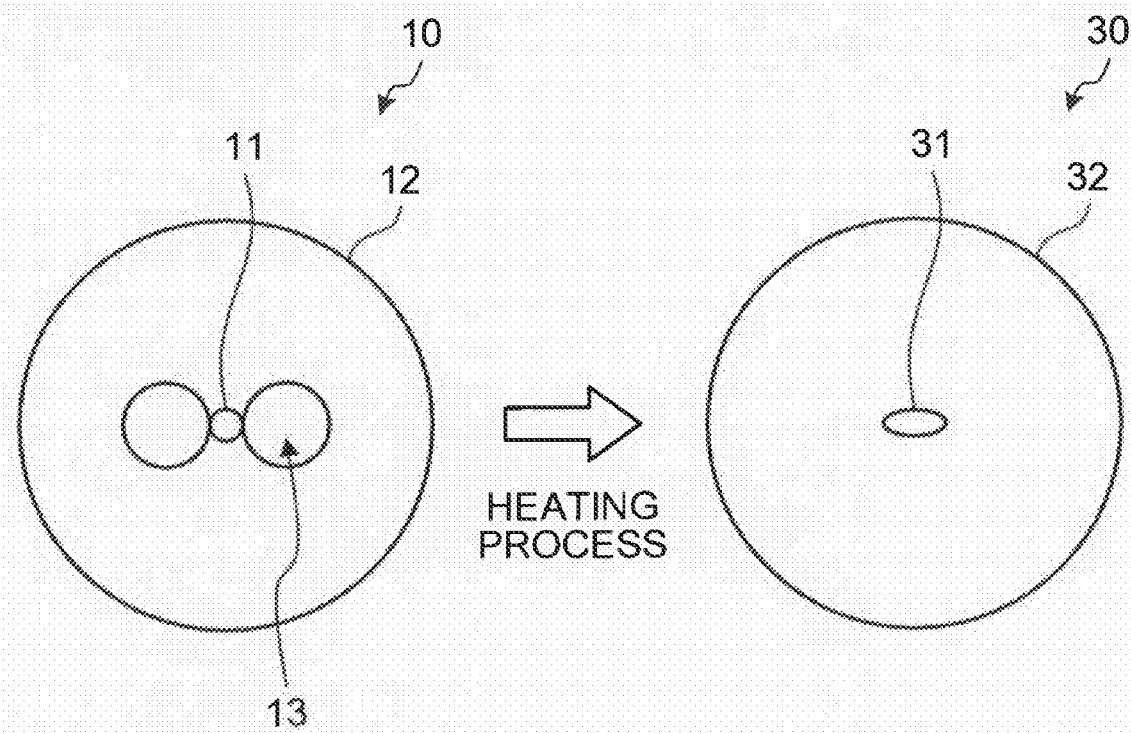

POLARIZATION-MAINTAINING OPTICAL FIBER, METHOD OF MANUFACTURING POLARIZATION-MAINTAINING OPTICAL-FIBER CONNECTING PORTION, AND POLARIZATION-MAINTAINING OPTICAL-FIBER CONNECTING PORTION

CROSS-REFERENCE TO RELATED APPLICATIONS

This application is a continuation of PCT/JP2007/063915 filed on Jul. 12, 2007, the entire content of which are incorporated herein by reference.

BACKGROUND OF THE INVENTION

1. Field of the Invention

The present invention relates to a side-tunnel-type polarization-maintaining optical fiber, a method of manufacturing a polarization-maintaining optical-fiber connecting portion, and a polarization-maintaining optical-fiber connecting portion.

2. Description of the Related Art

The polarization-maintaining optical fiber is an optical fiber that propagates a light while maintaining a polarization state of the light. A stress-applying-type polarization-maintaining optical fiber in which orthogonal axes having different effective refractive index from each other are formed by arranging stress applying members in opposite to each other across the core region and an elliptic-core-type polarization-maintaining optical fiber including an elliptic core region are examples of the polarization-maintaining optical fiber.

On the other hand, a side-tunnel-type polarization-maintaining optical fiber has been researched since a long time ago as a polarization-maintaining optical fiber that does not require a stress applying member, and it is known that the single polarization characteristic can be obtained by adjusting the refractive index profile of the core region. For example, a polarization-maintaining optical fiber disclosed in Japanese Patent Application Laid-Open No. 2004-264405 is characterized in that a transmission loss caused by an OH loss and a leakage loss is reduced by taking a structure in which a gap is provided between the core region and holes.

However, the polarization-maintaining optical fiber disclosed in Japanese Patent Application Laid-Open No. 2004-264405 has a problem that the gap between the core region and the holes decreases the modal birefringence, so that the polarization maintaining property is degraded. Although it is described in Japanese Patent Application Laid-Open No. 2004-264405 that a modal birefringence equivalent to that of a standard stress-applying-type polarization-maintaining optical fiber can be obtained by considerably increasing the refractive index of the core region or by decreasing the core diameter, if the refractive index of the core region is increased, the nonlinear characteristic is increased because the mode field diameter is decreased. In addition, there is a problem that the macro-bending loss is greatly increased, if the core diameter is decreased.

SUMMARY OF THE INVENTION

It is an object of the present invention to at least partially solve the problems in the conventional technology.

According to an aspect of the present invention, there is provided a polarization-maintaining optical fiber including a core region and a cladding region formed around the core region. The cladding region has a refractive index lower than a refractive index of the core region. A refractive index profile of the core region is either one of a step shaped or a concave shaped. The cladding region includes two holes formed in such a manner that a shortest distance from the core region is virtually zero at locations in opposite to each other across the core region.

Furthermore, according to another aspect of the present invention, there is provided a method of manufacturing a polarization-maintaining optical-fiber connecting portion including forming an elliptic core region at a facet of a polarization-maintaining optical fiber that includes a core region and a cladding region formed around the core region, the cladding region having a refractive index lower than a refractive index of the core region, wherein a refractive index profile of the core region is either one of a step shaped or a concave shaped, and the cladding region includes two holes formed in such a manner that a shortest distance from the core region is virtually zero at locations in opposite to each other across the core region, by collapsing the holes at the facet; and fusion splicing the polarization-maintaining optical fiber and a stress-applying-type polarization-maintaining optical fiber by aligning polarization axes of the elliptic core region and the stress-applying-type polarization-maintaining optical fiber.

Moreover, according to still another aspect of the present invention, there is provided a method of manufacturing a polarization-maintaining optical-fiber connecting portion including fusion splicing a polarization-maintaining optical fiber that includes a core region and a cladding region formed around the core region, the cladding region having a refractive index lower than a refractive index of the core region, wherein a refractive index profile of the core region is either one of a step shaped or a concave shaped, and the cladding region includes two holes formed in such a manner that a shortest distance from the core region is virtually zero at locations in opposite to each other across the core region, and a stress-applying-type polarization-maintaining optical fiber by aligning polarization axes of the polarization-maintaining optical fiber and the stress-applying-type polarization-maintaining optical fiber in such a manner that the holes at a facet of the polarization-maintaining optical fiber are not collapsed; and forming an elliptic core region at the facet by heating the facet of a fusion spliced polarization-maintaining optical fiber so that the holes are collapsed.

Furthermore, according to still another aspect of the present invention, there is provided a polarization-maintaining optical-fiber connecting portion manufactured by forming an elliptic core region at a facet of a polarization-maintaining optical fiber that includes a core region and a cladding region formed around the core region, the cladding region having a refractive index lower than a refractive index of the core region, wherein a refractive index profile of the core region is either one of a step shaped or a concave shaped, and the cladding region includes two holes formed in such a manner that a shortest distance from the core region is virtually zero at locations in opposite to each other across the core region, by collapsing the holes at the facet; and fusion splicing the polarization-maintaining optical fiber and a stress-applying-type polarization-maintaining optical fiber by aligning polarization axes of the elliptic core region and the stress-applying-type polarization-maintaining optical fiber. In a fusion-splicing portion, a crosstalk is equal to or smaller than −30 dB, and a connection loss is equal to or smaller than 1.0 dB.

Moreover according to still another aspect of the present invention, there is provided a polarization-maintaining optical-fiber connecting portion manufactured by forming an elliptic core region at a facet of a polarization-maintaining optical fiber that includes a core region and a cladding region formed around the core region, the cladding region having a refractive index lower than a refractive index of the core region, wherein a refractive index profile of the core region is either one of a step shaped or a concave shaped, and the cladding region includes two holes formed in such a manner that a shortest distance from the core region is virtually zero at locations in opposite to each other across the core region, by collapsing the holes at the facet; and fusion splicing the polarization-maintaining optical fiber and a stress-applying-type polarization-maintaining optical fiber by aligning polarization axes of the elliptic core region and the stress-applying-type polarization-maintaining optical fiber. In a fusion-splicing portion, a crosstalk is equal to or smaller than −30 dB, and a connection loss is equal to or smaller than 0.5 dB.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a table showing characteristics of a polarization-maintaining optical fiber according to a second to a fourteenth embodiment examples;

FIG. 13 is a table showing characteristics of a polarization-maintaining optical fiber according to a fifteenth to a twentieth embodiment examples;

FIG. 14 is a schematic diagram for explaining a method of manufacturing a polarization-maintaining optical-fiber connecting portion according to a third embodiment of the present invention;

DETAILED DESCRIPTION OF THE PREFERRED EMBODIMENTS

Exemplary embodiments of a polarization-maintaining optical fiber, a method of manufacturing a polarization-maintaining optical-fiber connecting portion, and a polarization-maintaining optical-fiber connecting portion according to the present invention will be explained in detail below with reference to the accompanying drawings. However, the present invention is not to be considered limited to the embodiments. The cutoff wavelength $\lambda_c$ referred in this specification means the fiber cutoff wavelength $\lambda_c$ defined in ITU-T (International Telecommunication Union) G. 650. Other terminologies not specifically defined in this specification comply with the definitions and the measurement methods in the ITU-T G. 650. As for a leakage loss, it indicates a calculation value calculated from a cross-sectional structure of an optical fiber.

Figure 1:
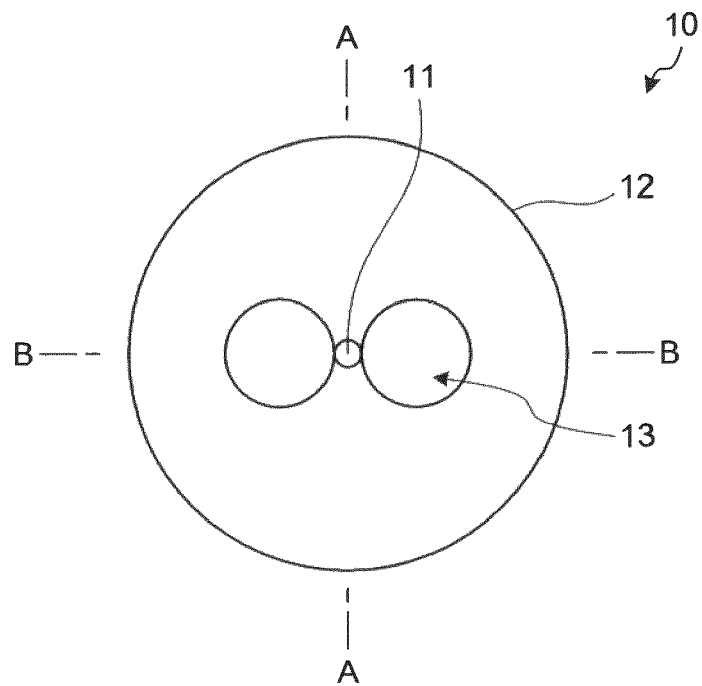
FIG. 1 is a schematic cross section of a polarization-maintaining optical fiber according to a first embodiment of the present invention.

FIG. 1 is a schematic cross section of a polarization-maintaining optical fiber 10 according to a first embodiment of the present invention. As shown in FIG. 1, the polarization-maintaining optical fiber 10 includes a core region 11 and a cladding region 12 that is formed on the outer circumference of the core region 11. The refractive index of the cladding region 12 is lower than that of the core region 11. The core region 11 is made of germanium-doped silica glass, and the cladding region 12 is made of pure silica glass into which no dopant for adjusting the refractive index is doped. The cladding region 12 has two holes 13 opposite to each other across the core region 11. Either of the holes 13 is formed in such a manner that the minimum distance from the core region 11 is virtually zero. The minimum distance will be explained in detail later.

Figure 2:
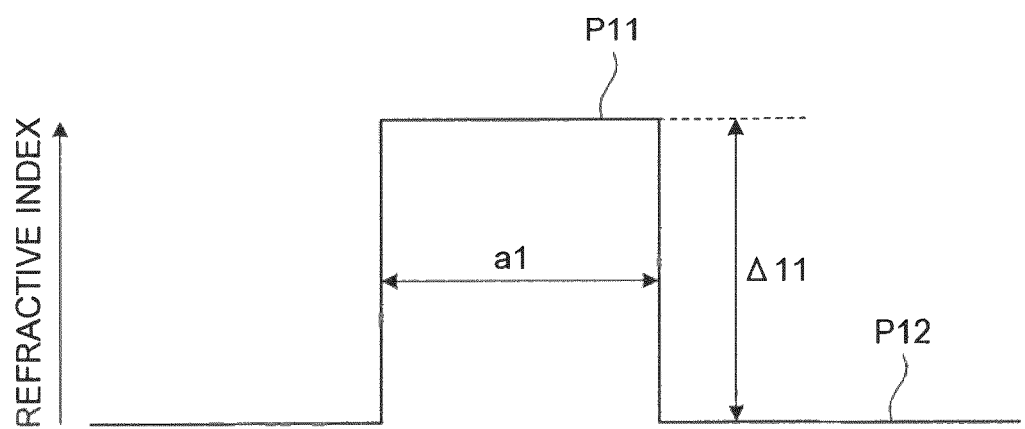
FIG. 2 is a schematic diagram illustrating a refractive index profile of the polarization-maintaining optical fiber shown in FIG. 1 at a cross section cut in a line A-A.

FIG. 2 is a schematic diagram illustrating a refractive index profile of the polarization-maintaining optical fiber 10 shown in FIG. 1 at a cross section cut in a line A-A. As shown in FIG. 2, a refractive index profile P11 in the core region 11 is a step-index-type index profile in which the refractive index is constant within the core region 11. A refractive index profile P12 in the cladding region 12 has a shape in which the refractive index is constant within the cladding region 12, and the relative refractive index difference of the core region 11 with respect to the cladding region 12 is Δ11. The relative refractive index difference Δ11 is defined by $$\Delta 11 = \{(n_{cl} - n_c)/n_{cl}\} \times 100 \quad (1)$$

where $n_{cl}$ is the maximum refractive index of the core region 11, and $n_c$ is the refractive index of the cladding region 12.

The core diameter of the core region 11 is a1. The core diameter is defined by the diameter of the core region 11 at a position representing the relative refractive index difference of ½ of Δ11 at the boundary between the core region 11 and the cladding region 12.

Figure 3:
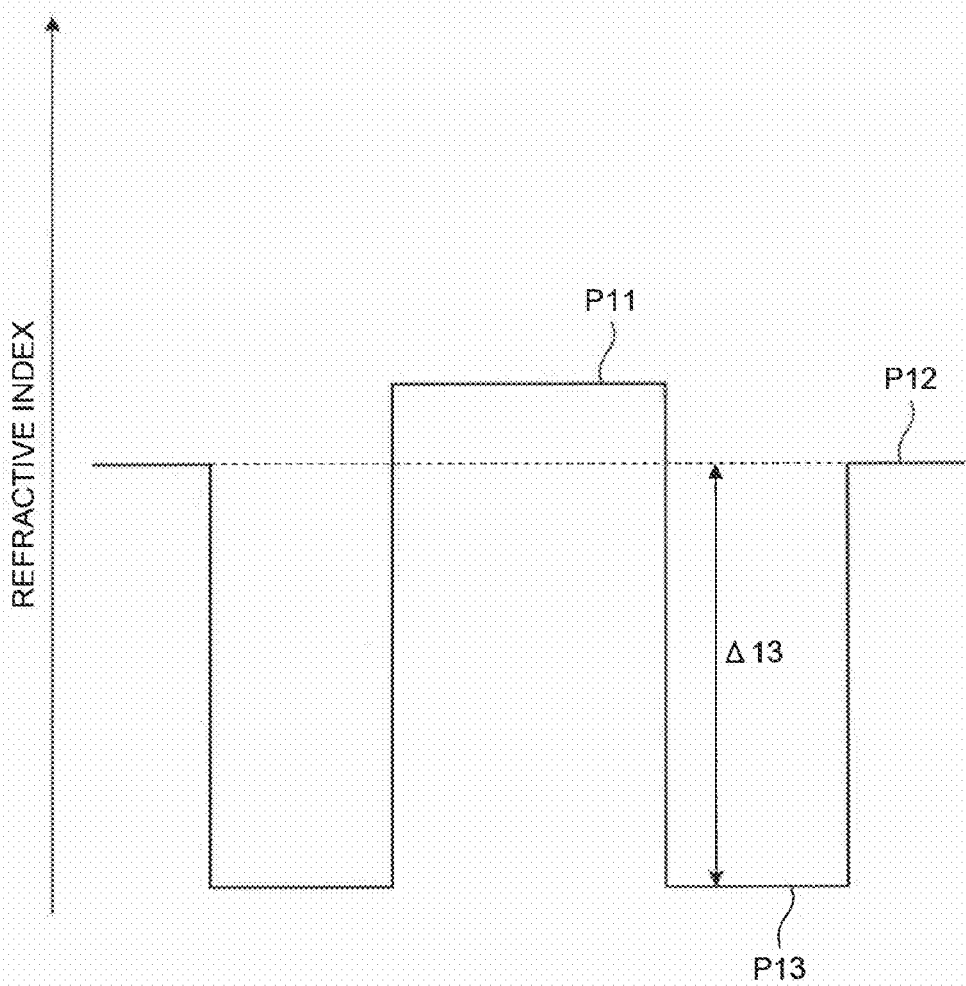
FIG. 3 is a schematic diagram illustrating a refractive index profile of the polarization-maintaining optical fiber shown in FIG. 1 at a cross section cut in a line B-B.

Meanwhile, FIG. 3 is a schematic diagram illustrating a refractive index profile of the polarization-maintaining optical fiber 10 shown in FIG. 1 at a cross section cut in a line B-B. The line A-A and the line B-B are perpendicular to each other. As shown in FIG. 3, the refractive index profiles P11 and P12 in the core region 11 and the cladding region 12 have the same profiles as those shown in FIG. 2, respectively; however, because the cross section of the line B-B includes the holes 13, the refractive index profile at the cross section of the line B-B includes a refractive index profile P13 where the refractive index is decreased in the holes 13. Besides, because the holes 13 are typically filled with the air, a relative refractive index difference Δ13 of the holes 13 with respect to the cladding region 12 is generally the same as the relative refractive index difference of the air with respect to the cladding region 12.

As shown in FIGS. 1 to 3, in the polarization-maintaining optical fiber 10, a difference occurs in the effective refractive index because the refractive index profile is different between the line A-A direction and the line B-B direction that are perpendicular to each other, so that the polarization maintaining property is obtained from a generation of the modal birefringence.

Furthermore, in the polarization-maintaining optical fiber 10, because the holes 13 are formed in such a manner that the minimum distance from the core region 11 is virtually zero, the modal birefringence becomes large and the polarization maintaining property is increased. In addition, in the polarization-maintaining optical fiber 10, because the refractive index profile P11 of the core region 11 forms a step-index-type profile, it is possible to suppress a spatial coupling of the field distribution of a light propagating through the core region 11 with the holes 13 to the minimum level, even though the minimum distance between the core region 11 and the holes 13 is virtually zero. As a result, an occurrence of the absorption loss of the light due to the residual OH group on the inner wall of the holes 13 and an occurrence of the leakage loss of the light into the holes 13 can be suppressed, so that the transmission loss of the polarization-maintaining optical fiber 10 can be reduced.

More details on the polarization-maintaining optical fiber 10 will be explained below. An effect of a relationship between the hole diameter of the holes 13 and the core diameter of the core region 11 on the modal birefringence and the leakage loss will be explained. Comparing the modal birefringence between the cases in which the size of the holes is one and a half of the core diameter and double the core diameter, the case in which the size of the holes is double the core diameter shows that the modal birefringence is about 10% to 15% larger. When the size of the holes is larger than double the core diameter, the change of the modal birefringence with the change of the hole diameter is equal to or smaller than 10%, which does not show a big difference. Furthermore, comparing the leakage loss between the cases in which the size of the holes is one and a half of the core diameter and double the core diameter, the case in which the size of the holes is double the core diameter shows that the leakage loss is more than 200% larger. However, when the size of the holes is larger than double the core diameter, the change of the leakage loss with the change of the hole diameter is smaller than 200%, which shows a similar degree of order. Therefore, considering the stability of the modal birefringence and the leakage loss, it is desirable that the size of the holes should be equal to or more than double the core diameter.

Next, a relationship between the distance between the core region 11 and the holes 13 and the modal birefringence and the leakage loss will be explained.

Figure 4:
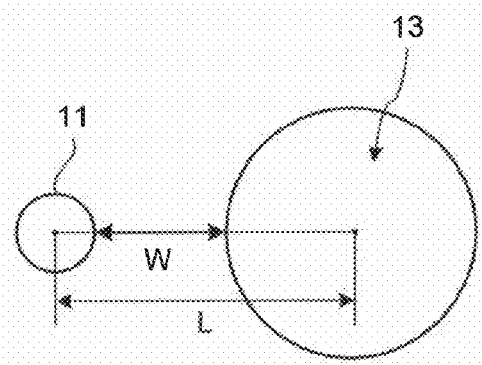
FIG. 4 is a schematic diagram for explaining a definition of the shortest distance between a core region and a hole.

As shown in FIG. 4, the minimum distance W [μm] between the outer circumference of the core region 11 and the inner wall of the holes 13 is defined on a line that connects the center axis of the core region 11 and the center axis of the holes 13. When the core diameter is a1, the hole diameter is b1, the distance between the centers of the core region 11 and the holes 13 is L, W is defined by W=L−(a1+b1)/2.

Figures 5, 6:
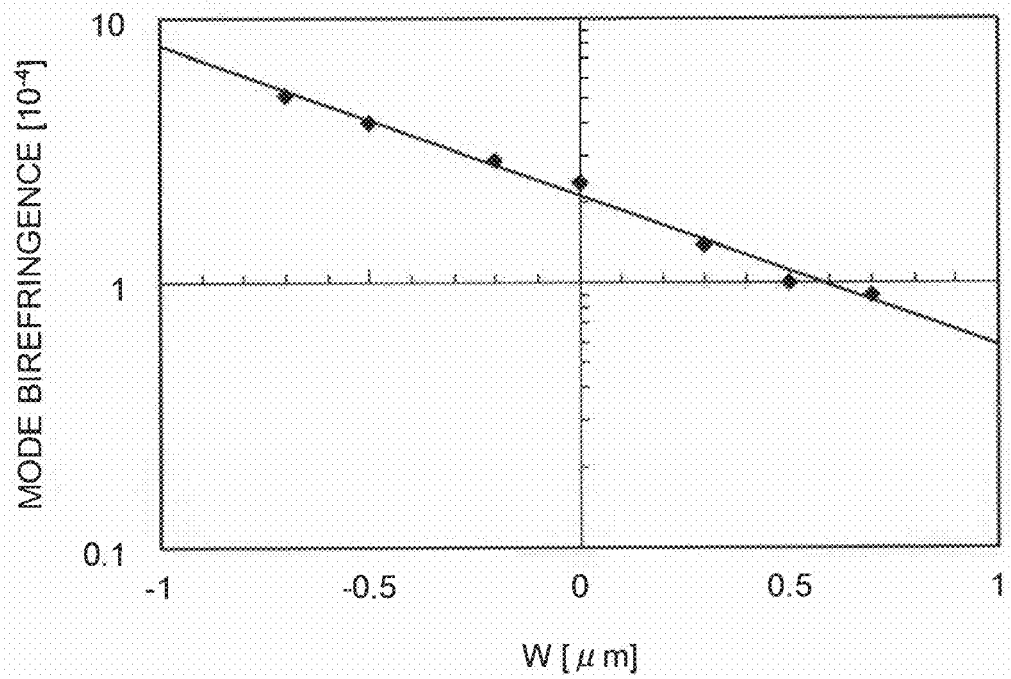
FIG. 5 is a graph showing a change of modal birefringence when W is changed in a polarization-maintaining optical fiber having the same structure as the one shown in FIG. 1.
FIG. 6 is a table showing a change of the leakage loss when α value defining the refractive index profile is changed in a polarization-maintaining optical fiber having the same structure as the one shown in FIG. 1.

FIG. 5 is a graph showing a change of modal birefringence when W is changed in a polarization-maintaining optical fiber having the same structure as the polarization-maintaining optical fiber 10, where the core diameter is 6 μm, the hole diameter is 25 μm, and the relative refractive index difference Δ11 is 0.8%. As shown in FIG. 5, the modal birefringence is increased as W is decreased. In addition, by overlapping the holes with the core region, even larger modal birefringence is obtained. Because the polarization-maintaining optical fiber 10 according to the first embodiment has W that is virtually zero, the modal birefringence is $2.4 \times 10^{-4}$, which means that the polarization maintaining property can be realized, which is equal to or larger than that of the typical stress-applying-type polarization-maintaining optical fiber in which the value of the modal birefringence is $2.0 \times 10^{-4}$, and therefore, it is possible to stably obtain a large polarization maintaining property even with a consideration of the variation of W at the case of manufacturing the fiber. For example, if W varies in a range from −0.1 μm to 0.2 μm when manufacturing the fiber, the modal birefringence is still equal to or larger than $1.6 \times 10^{-4}$, which is larger enough value.

On the other hand, if the hole is excessively overlapped with the core region, the leakage loss is increased, which is not desirable. Assuming that W varies in the range from −0.1 μm to 0.2 μm, the leakage loss in the case in which W is 0.2 μm is about one tenth of the leakage loss in the case in which W is 0 μm, which is small enough. Furthermore, the leakage loss in the case in which W is −0.1 μm is about double the leakage loss in the case in which W is 0 μm, which is a difference that is smaller than 0.01 dB/km that is considered to be within the tolerance not affecting the transmission loss, which does not cause any problem. In other words, as long as W is in the range from −0.1 μm to 0.2 μm, a large enough modal birefringence can be obtained with a small enough leakage loss.

Next, more details on a relationship between the refractive index profile of the core region of the polarization-maintaining optical fiber and the leakage loss will be explained. As described above, the refractive index profile P11 in the core region 11 of the polarization-maintaining optical fiber 10 is a step-index-type profile in which the refractive index is constant within the core region 11. However, in practice, there is a case in which the refractive index profile P11 is not an ideal step-index-type profile but an α-type profile.

The α-type profile is defined by $$n^2(r) = n_{core}^2 \times \{1 - 2 \times (\Delta/100) \times (r/a)^\alpha\} \text{ (where } 0 < r < a) \quad (2)$$

where, α is the α value that is the parameter defining the α-type profile, r is a point from the center of the core region in the radial direction, n(r) is the refractive index at the point r, $n_{core}$ is the refractive index at r=0 in the core region, Δ is Δ11 in Equation (1), and a is the radius of the core region. In addition, the "^" is a symbol representing an exponential.

When the refractive index profile P11 of the core region 11 of the polarization-maintaining optical fiber 10 is the α-type profile, the leakage loss is small enough if the α value is equal to or larger than 3.5, which is desirable. An explanation about this aspect will be given below.

FIG. 6 is a table showing a change of the leakage loss when α value defining the refractive index profile is changed in a polarization-maintaining optical fiber having the same structure as the polarization-maintaining optical fiber 10, where the refractive index profile of the core region is formed in the α-type profile, the core diameter is 6.5 μm, the hole diameter is 22 μm, and the maximum value of the relative refractive index difference of the core region with respect to the cladding region is 0.6%. As shown in FIG. 6, if the α value is equal to or larger than 3.5, the leakage loss is 0.0028 dB/km, which can be equal to or smaller than 0.01 dB/km for sure, which is desirable. Furthermore, if the α value is equal to or larger than 10, the α-type profile becomes the same as the ideal step-index-type profile, which is more desirable.

The α value is the parameter that defines the refractive index profile of the entire core region. However, as long as the α value of the refractive index profile of the core region at the boundary between the core region and the cladding region is equal to or larger than 3.5 when the profile from a point at which the relative refractive index difference is zero to a point at which the relative refractive index difference is three quarters of the maximum value is approximated with the α-type refractive index profile, the leakage loss becomes small enough.

Next, more details on a relationship between the relative refractive index difference and the core diameter of the core region of the polarization-maintaining optical fiber and the leakage loss will be explained. In the polarization-maintaining optical fiber 10 according to the first embodiment, although it is effective to reduce the core diameter in order to increase the modal birefringence, if the core diameter is simply reduced, the light confinement becomes weak with the decrease of the core diameter, and so that the macro-bending loss is increased. Therefore, when reducing the core diameter, it is desirable to increase the relative refractive index difference of the core region.

Figure 7:
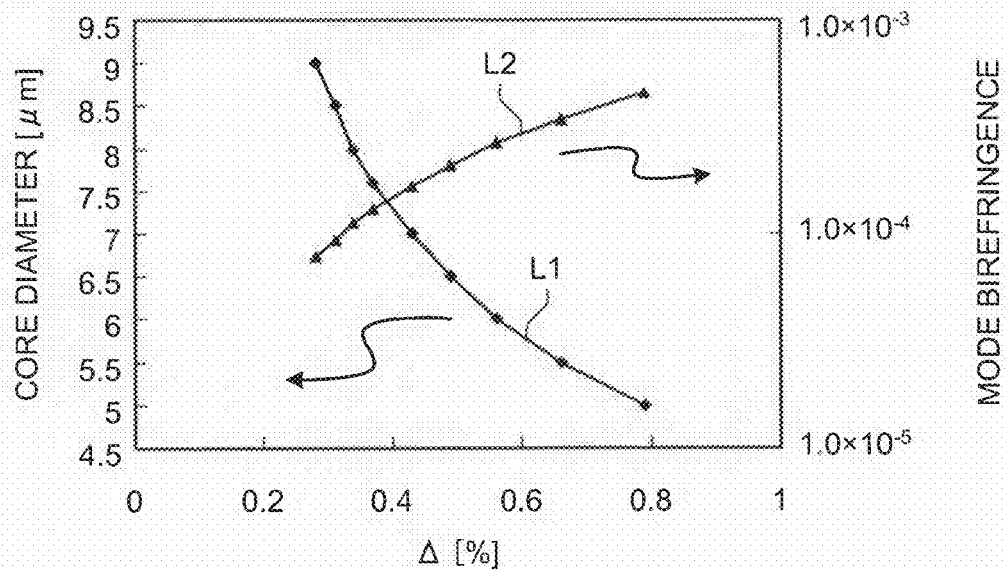
FIG. 7 is a graph showing a relationship between a relative refractive index difference Δ of the core region and a core diameter under a condition A and a relationship between the relative refractive index difference Δ and the modal birefringence under the condition A in a polarization-maintaining optical fiber having the same structure as the one shown in FIG. 1.

FIG. 7 is a graph showing a relationship between a relative refractive index difference Δ of the core region and a core diameter under a condition that the leakage loss at the wavelength of 1550 nm is 0.01 dB/km (hereinafter, "condition A") and a relationship between the relative refractive index difference Δ and the modal birefringence under the condition A in a polarization-maintaining optical fiber having the same structure as the polarization-maintaining optical fiber 10, where the hole diameter is 25 μm. A line L1 shows the relationship between the relative refractive index difference Δ and the core diameter under the condition A, and a line L2 shows the relationship between the relative refractive index difference Δ and the modal birefringence under the condition A. The line L2 represents the case of the equal sign in following Equation (3), where a is the core diameter, and an upper right area from the line L2 represents the case of the inequality sign in Equation (3).

$$a \geq -24.221 \times \Delta^3 + 51.718 \times \Delta^2 - 40.786 \times \Delta + 16.878 \quad (3)$$

Therefore, as long as the relationship between the relative refractive index difference Δ and the core diameter of the core region 11 of the polarization-maintaining optical fiber 10 is maintained such that Equation (3) is satisfied, the leakage loss at the wavelength of 1550 nm becomes equal to or smaller than 0.01 dB/km, which is desirable.

Furthermore, as indicated by the line L2 shown in FIG. 7, when the relationship between the relative refractive index difference and the core diameter of the core region is represented by Equation (3), if the relative refractive index difference is equal to or larger than 0.32%, it is possible to obtain the modal birefringence equal to or larger than $1.0 \times 10^{-4}$, which is considered to be enough value in a practical standpoint, which is desirable. Furthermore, if the relative refractive index difference is equal to or larger than 0.47, it is possible to obtain the modal birefringence equal to or larger than $2.0 \times 10^{-4}$, which is even more desirable.

Next, more details on a relationship between the relative refractive index difference and the core diameter of the core region of the polarization-maintaining optical fiber and the macro-bending will be explained. In the polarization-maintaining optical fiber 10 according to the first embodiment, if the core diameter is simply reduced, the macro-bending is increased with the decrease of the core diameter, and therefore, it is desirable that the core diameter is reduced considering the relationship with the relative refractive index difference of the core region.

Figure 8:
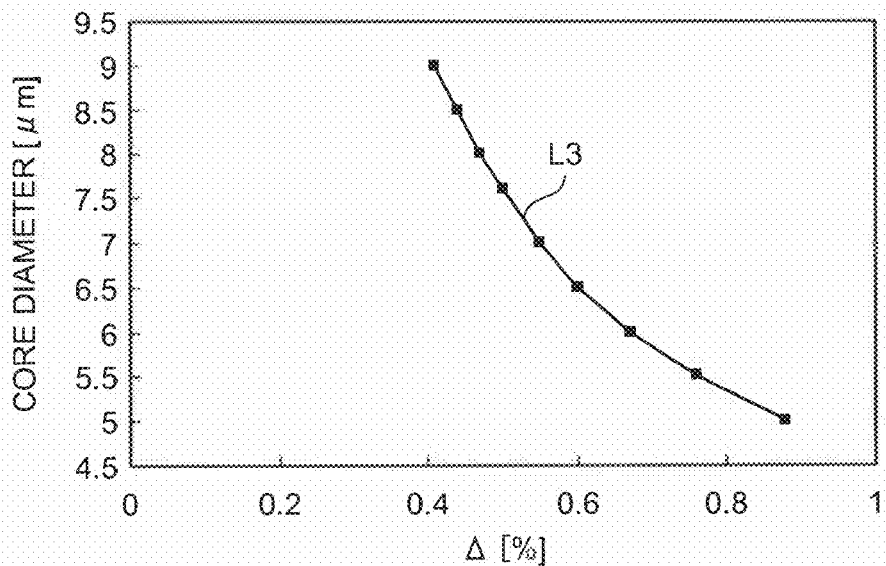
FIG. 8 is a graph showing a relationship between the relative refractive index difference Δ of the core region and the core diameter under a condition B in a polarization-maintaining optical fiber having the same structure as the one shown in FIG. 1.

FIG. 8 is a graph showing a relationship between the relative refractive index difference Δ of the core region and the core diameter under a condition that the macro-bending loss at the wavelength of 1550 nm when the fiber is bent with a curvature radius of 10 mm is 0.1 dB/m (hereinafter, "condition B") in a polarization-maintaining optical fiber having the same structure as the polarization-maintaining optical fiber 10, where the hole diameter is 25 μm. A line L3 shows the relationship between the relative refractive index difference Δ and the core diameter under the condition B. The line L3 represents the case of the equal sign in following Equation (4), where a is the core diameter, and an upper right area from the line L3 represents the case of the inequality sign in Equation (4).

$$a \geq -25.065 \times \Delta^3 + 63.802 \times \Delta^2 - 58.165 \times \Delta + 23.858 \quad (4)$$

Therefore, as long as the relationship between the relative refractive index difference Δ and the core diameter of the core region 11 of the polarization-maintaining optical fiber 10 is maintained such that Equation (4) is satisfied, the macro-bending loss at the wavelength of 1550 nm when the fiber is bended with the curvature radius of 10 mm becomes equal to or smaller than 0.1 dB/m. As a result, the handling of the polarization-maintaining optical fiber 10 at the condition of installing becomes easy. In addition, because the winding diameter at the condition of coiling the fiber can be made compact, it is suitable for manufacturing a compact size optical-fiber module.

Next, more details on a relationship between the relative refractive index difference and the core diameter of the core region of the polarization-maintaining optical fiber and the cutoff wavelength will be explained.

Figure 9:
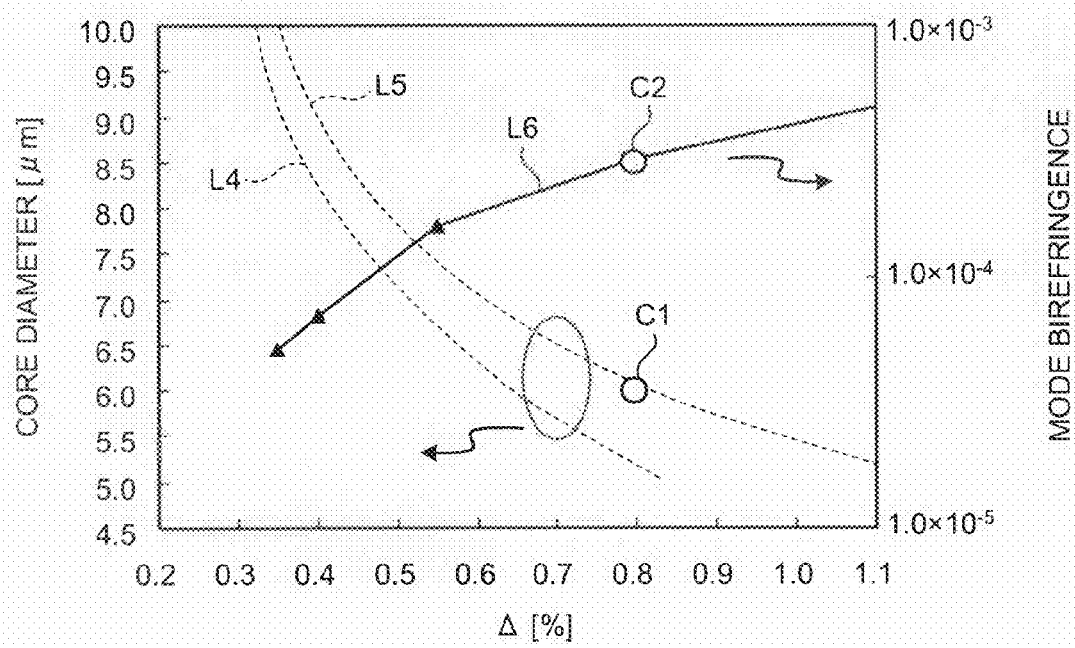
FIG. 9 is a graph showing a relationship between the relative refractive index difference Δ of the core region and the core diameter under a condition C, a relationship between the relative refractive index difference Δ and the modal birefringence under the condition C, and a relationship between the relative refractive index difference Δ of the core region and the core diameter under a condition A in a polarization-maintaining optical fiber having the same structure as the one shown in FIG. 1.

FIG. 9 is a graph showing a relationship between the relative refractive index difference Δ of the core region and the core diameter under a condition that the cutoff wavelength is 1300 nm (hereinafter, "condition C"), a relationship between the relative refractive index difference Δ and the modal birefringence under the condition C, and a relationship between the relative refractive index difference Δ of the core region and the core diameter under the condition A that the leakage loss at the wavelength of 1550 nm is 0.01 dB/km in a polarization-maintaining optical fiber having the same structure as the polarization-maintaining optical fiber 10, where the hole diameter is 30 μm (in this case, the cladding diameter is 60 μm). A line L5 shows the relationship between the relative refractive index difference Δ and the core diameter under the condition C, a line L6 shows the relationship between the relative refractive index difference Δ and the modal birefringence under the condition C, and a line L4 shows the relationship between the relative refractive index difference Δ and the core diameter under the condition A.

In FIG. 9, because the distance between the holes and the core region is set to zero, if the core diameter is changed, the center positions of the cores are also changed with the change of the core diameter. Furthermore, if the relative refractive index difference Δ is decreased with the core diameter fixed, the leakage loss of the polarization-maintaining optical fiber is increased. Although it is not shown in FIG. 9, the bending loss in this case is also increased. On the other hand, if the relative refractive index difference Δ is increased with the core diameter fixed, the loss of the higher-order mode is decreased, and as a result, the polarization-maintaining optical fiber becomes a multimode fiber.

The wavelength of the propagating light becomes longer, then the larger leakage loss is caused, and the wavelength of the light becomes shorter, then it makes the multimode operation easier. Therefore, when calculating the relationships represented by the lines L4 and L5 shown in FIG. 9, an upper limit value and a lower limit value of the relative refractive index difference Δ are set by assuming that the polarization-maintaining optical fiber is used in a wavelength band range from a 1.3 μm band (1280 nm to 1330 nm) to a 1.55 cm band (1530 nm to 1565 nm). In other words, the lines L4 and L5 show, with respect to each core diameter, a relative refractive index difference Δ with which the leakage loss of either one of fundamental modes of the electric field at two orthogonal polarization axes at the wavelength of 1550 nm becomes 0.01 dB/km for the lower limit value of the relative refractive index difference Δ, and for the larger limit of the relative refractive index difference Δ, a relative refractive index difference Δ with which the fiber is operating in multimode at the wavelength of 1300 nm.

In the polarization-maintaining optical fiber 10 according to the first embodiment, a combination of the core diameter and the relative refractive index difference Δ corresponding to the area on the line L5 or the lower left side of the line L5 gives the cutoff wavelength equal to or shorter than 1300 nm, which is desirable. On the other hand, a combination of the core diameter and the relative refractive index difference Δ corresponding to the area on the line L4 or the upper right side of the line L5 gives the leakage loss equal to or smaller than 0.01 dB/km, which is desirable. Therefore, it is desirable that the combination of the core diameter and the relative refractive index difference Δ should be corresponding to the area between the Line L4 and the line L5.

The line L6 shows the relationship between the relative refractive index difference Δ and the modal birefringence under the condition C, i.e., the critical condition that the polarization-maintaining optical fiber 10 operates in multimode in the upper limit of the relative refractive index difference. As shown in FIG. 9, it can be found that the larger relative refractive index difference Δ gives the larger modal birefringence. Furthermore, because the maximum range of the relative refractive index difference Δ when fixing the core diameter, i.e., the tolerance of the relative refractive index difference Δ is larger, it is advantageous to have the larger relative refractive index difference Δ from a viewpoint of realizing a low polarization crosstalk and a low leakage loss as a polarization-maintaining optical fiber. However, because the larger relative refractive index difference Δ causes the mode field diameter to be decreased, the connection loss when connecting with other optical fibers may be increased, and therefore, it is necessary to select an appropriate relative refractive index difference Δ.

For example, when the relative refractive index difference Δ is 0.8% and the core diameter is 6.0 μm, it is indicated by a data point C1 shown in FIG. 9. Because the data point C1 is located in the area between the lings L4 and L5, it is a desirable combination. In addition, the modal birefringence in the case of the above combination is represented by a data point C2 with the value of $2.8 \times 10^{-4}$, which is a larger enough value.

As a first embodiment example of the present invention, a polarization-maintaining optical fiber having the same structure as the first embodiment has been fabricated. Its fabricating method will be explained below. A germanium-doped porous silica preform is fabricated using the VAD method, and it is vitrified to fabricate a core base made of silica glass. The relative refractive index difference of the core base with respect to the pure silica glass is virtually constant to be 0.8% in the radial direction. Furthermore, in order to make the refractive index profile of the core base an ideal step-index-type profile, the outer circumference of the core base is removed by a predetermined thickness by etching. After that, a measurement of the refractive index profile of the core base shows a virtually vertical rise from a position of the outer circumference to a point at which the relative refractive index difference is 0.7%. When the refractive index profile of the core base is approximated by the α-type profile, the α value is substantially equal to or larger than 10.

Subsequently, a pure silica layer that will be the cladding layer is formed on the outer side of the core base, and it is vitrified again to fabricate an optical-fiber preform. The optical-fiber preform has the outer diameter of 40 mm, and the diameter of the core region is 1.92 mm. After that, two holes are formed by a mechanical drilling in a region of the optical-fiber preform, which becomes the cladding, with the finishing diameter of 8 mm, and the inner surfaces of the holes are polished. The two holes are formed at positions in opposite to each other across the core base in such a manner that the minimum distance from the outer diameter of the core base is virtually zero. Finally, the optical-fiber preform is drawn in such a manner that the cladding diameter is 125 μm to fabricate the polarization-maintaining optical fiber.

The polarization-maintaining optical fiber according to the first embodiment example has the core diameter of the core region of 6 μm, the relative refractive index difference of the core region with respect to the cladding region of 0.8%, and the refractive index profile of the core region is a step-index-type profile. In addition, because the refractive index profile of the core region is the same as the refractive index profile of the core base, when it is approximated by the α-type profile, the α value is substantially equal to or larger than 10. Both of the hole diameters of the two holes are 25 μm.

The optical characteristics of the polarization-maintaining optical fiber according to the first embodiment example are as follows. The modal birefringence is $2.4 \times 10^{-4}$, which is equivalent or larger than the value of the commercially available stress-applying-type polarization-maintaining optical fiber. The resultant polarization crosstalk is equal to or smaller than −40 dB. The cutoff wavelength $\lambda_c$ is 1050 nm. Therefore, the polarization-maintaining optical fiber according to the first embodiment example operates in single mode in wavelength bands of 1.3 μm and 1.55 μm. In addition, the macro-bending loss at the wavelength band of 1550 nm when the fiber is bended with a curvature radius of 10 mm is 0.03 dB/m, which means that the increase of the transmission loss is small even when the fiber is bended with a small radius. Furthermore, the transmission loss at the wavelength of 1550 nm is 1.9 dB/km, with which the tolerance range is enough to use the fiber as an optical component of which the branch length is about a few hundred m. Moreover, the noncircularity of the core region is about 1%, and the formation of the holes causes almost no deformation of the core region. If the noncircularity of the core region is smaller than 10%, the anisotropy of the leakage loss can be suppressed, which is desirable.

By the way, by collapsing the hole by a heating process or the like in a portion of the polarization-maintaining optical fiber according to the first and the second embodiments and making the core region an elliptical shape, it is also possible to make the corresponding portion an elliptic-core-type polarization-maintaining optical fiber. The portion where such an elliptic-core-type polarization-maintaining optical fiber is formed shows a larger change of the wavelength dispersion value. Therefore, by adjusting the length of the elliptic core region to be formed, it is possible to change the wavelength dispersion value of the polarization-maintaining optical fiber. Even in the portion where the elliptic core region is formed, the polarization maintaining property and the single-mode operation property of the optical fiber are maintained.

As polarization-maintaining optical fibers according to a second to a fourteenth embodiment examples, a polarization-maintaining optical fiber having the same structure as the polarization-maintaining optical fiber according to the first embodiment example with changes of the relative refractive index difference of the core region, the α value, the core diameter, and the hole diameter of the holes has been fabricated. In all of the polarization-maintaining optical fibers, the minimum distance between the core region and the holes is set to zero.

FIG. 10 is a table showing the characteristics of a polarization-maintaining optical fiber according to the second to the fourteenth embodiment examples. In FIG. 10, "Δ11" is the relative refractive index difference of the core region, "α1" is the α value, and "α1" is the core diameter. As shown in FIG. 10, the polarization-maintaining optical fibers according to the second to the fourteenth embodiment examples have the modal birefringence equal to or larger than $1.0 \times 10^{-4}$, having a larger enough polarization maintaining property. In particular, the polarization-maintaining optical fibers according to the eighth to the fourteenth embodiment examples have the modal birefringence equal to or larger than $2.0 \times 10^{-4}$, which is equivalent or larger than the value of the general stress-applying-type polarization-maintaining optical fiber. The cutoff wavelengths of the polarization-maintaining optical fibers are all equal to or shorter than 1300 nm. As for the third, the fifth, the ninth, the eleventh, the twelfth, and the fourteenth embodiment examples, the macro-bending loss at the wavelength band of 1550 nm when the fiber is bended with a curvature radius of 10 mm is equal to or smaller than 0.1 dB/m, which means that the optical fiber is suitable for a usage accompanying a small-radius bending. In addition, as for the leakage loss calculated from the structure of the optical fiber, it is 0.01 dB/km for all of the polarization-maintaining optical fibers, which is a value that does not cause any problem of affecting the transmission loss.

Figure 11:
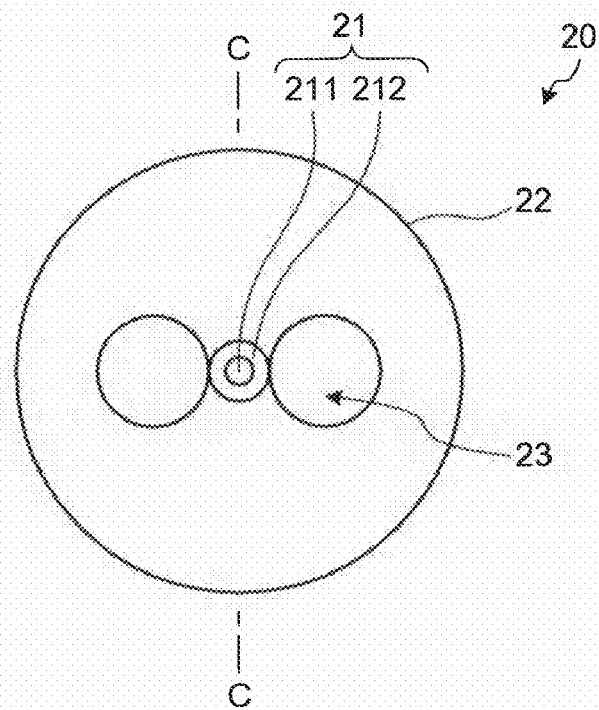
FIG. 11 is a schematic cross section of a polarization-maintaining optical fiber according to a second embodiment of the present invention.

FIG. 11 is a schematic cross section of a polarization-maintaining optical fiber 20 according to a second embodiment of the present invention. As shown in FIG. 11, the polarization-maintaining optical fiber 20 includes, in the same manner as the polarization-maintaining optical fiber 10 according to the first embodiment, a core region 21 made of germanium-doped silica glass and a cladding region 22 made of pure silica glass formed on the outer circumference of the core region 21. The cladding region 22 has two holes 23 formed at positions opposite to each other across the core region 21 in such a manner that the minimum distance from the core region 21 is virtually zero. However, unlike the polarization-maintaining optical fiber 10, the core region 21 includes a center core region 211 and an outer core region 212 that is formed on the outer circumference of the center core region 211. The refractive index of the outer core region 212 is higher than the refractive index of the center core region 211.

Figure 12:
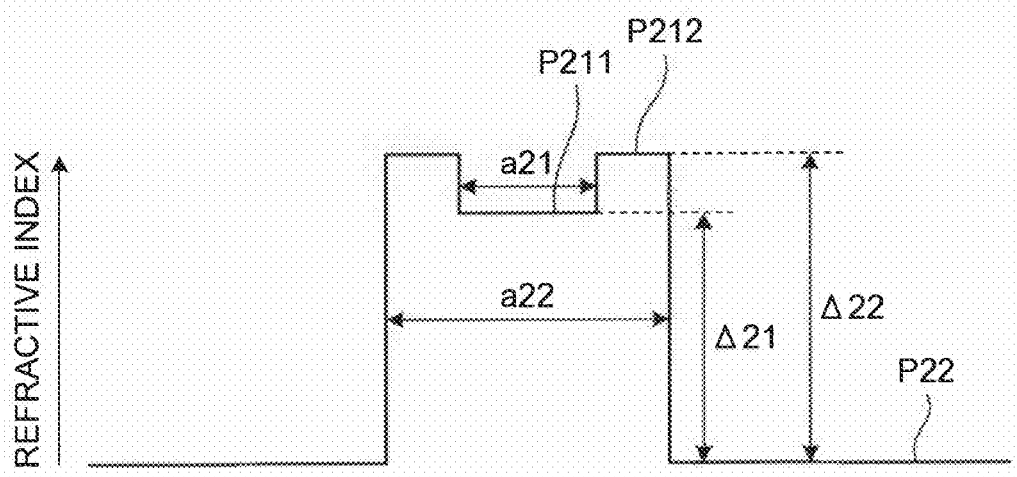
FIG. 12 is a schematic diagram illustrating a refractive index profile of the polarization-maintaining optical fiber shown in FIG. 11 at a cross section cut in a line C-C.

FIG. 12 is a schematic diagram illustrating a refractive index profile of the polarization-maintaining optical fiber shown in FIG. 11 at a cross section cut in a line C-C. As shown in FIG. 12, both a refractive index profile P211 in the center core region 211 and a refractive index profile P212 in the outer core region 212 form a profile in which the refractive index is constant, and the overall shape of the core region 21 is a concave-type refractive index profile. Furthermore, a refractive index profile P22 in the cladding region 22 forms a profile in which the refractive index is constant. The relative refractive index differences of the center core region 211 and the outer core region 212 with respect to the cladding region 22 are Δ21 and Δ22, respectively, where Δ22>Δ21. The outer diameter of the outer core region, i.e., the core diameter of the core region 21, is a22. The core diameter is defined by the diameter of the core region 21 at a position representing the relative refractive index difference of ½ of Δ22 at the boundary between the core region 21 and the cladding region 22. The diameter of the center core region 211 is a21. This diameter is defined by the diameter of the center core region 211 at a position representing the relative refractive index difference of ½ of (Δ22-Δ21) at the boundary between the center core region 211 and the outer core region 212.

On the other hand, because the holes 23 are formed in the cross section of the polarization-maintaining optical fiber 20 perpendicular to a line C-C, in the same manner as the polarization-maintaining optical fiber 10, the refractive index profile is also a profile on which the refractive index of the holes is reflected. As a result, in the polarization-maintaining optical fiber 20, a difference occurs in the effective refractive index because the refractive index profile is different between the line C-C direction and its perpendicular direction, so that the polarization maintaining property is obtained from a generation of the modal birefringence. Furthermore, in the polarization-maintaining optical fiber 20, because the holes 23 are formed in such a manner that the minimum distance from the core region 21 is virtually zero, the polarization maintaining property is increased, as in the same manner as the polarization-maintaining optical fiber 10. In addition, in the polarization-maintaining optical fiber 20, the refractive index profile of the core region 21 is a concave-type refractive index profile, the leakage loss is decreased as in the same manner as the polarization-maintaining optical fiber 10.

Furthermore, in the similar manner as the polarization-maintaining optical fiber 10, although the refractive index profile of the core region 21 is not an ideal concave-type profile, but may be an α-type profile at the boundary between the core region 21 and the cladding region 22, when the profile from a position where the relative refractive index difference is zero from a position where the relative refractive index difference is three quarters of the maximum value is approximated by the α-type refractive index profile, the leakage loss is decreased as long as the α value is equal to or larger than 3.5.

In this case, $n_{core}$ in Equation (2) is the maximum refractive index and Δ is Δ22. Furthermore, by assuming that the refractive index at r=0 is $n_{core}$ (the maximum refractive index of the core region), the profile to the position where the relative refractive index difference is three quarters of the maximum value is approximated by the α-type refractive index profile.

As polarization-maintaining optical fibers according to a fifteenth to a twentieth embodiment examples, a polarization-maintaining optical fiber having the same structure as the polarization-maintaining optical fiber according to the second embodiment with changes of the relative refractive index differences of the center core region and the outer core region, the diameter of the center core region, the core diameter of the core region and the α value, and the hole diameter of the holes has been fabricated.

FIG. 13 is a table showing the characteristics of the polarization-maintaining optical fiber according to the fifteenth to the twentieth embodiment examples. In FIG. 13, "Δ21" is the relative refractive index difference of the center core region, "Δ22" is the relative refractive index difference of the outer core region, "α2" is the α value, "a21" is the diameter of the center core region, and "a22" is the core diameter. In this case, the α value is an α value obtained when the profile from a position where the relative refractive index difference is zero from a position where the relative refractive index difference is three quarters of the maximum value is approximated by the α-type refractive index profile.

The polarization-maintaining optical fibers according to the fifteenth to the twentieth embodiment examples are corresponding to a fiber in which the refractive index profile of the core region is changed to a concave-type profile in the polarization-maintaining optical fibers according to the fifth, the ninth, the eleventh, the thirteenth, and the fourteenth embodiment examples. An explanation will be given below by comparing corresponding embodiment examples. As for the modal birefringence, all the fibers show virtually no difference on the order of $10^{-4}$. Furthermore, when the refractive index profile of the core region is formed in a concave shape, because the effective refractive index is decreased compared with a case of the step-index-type profile, the macro-bending loss tends to increase. For example, in the cases of the fifteenth and the twentieth embodiment examples, because the refractive index profile of the core region does not show much difference from the case of the step-index-type profile due to a small difference between Δ21 and Δ22, the increase of the macro-bending loss is about one digit with respect to the cases of the fifth and the fourteenth embodiment examples. However, in the cases of the sixteenth to the nineteenth embodiment examples, because the refractive index difference between Δ21 and Δ22 is 0.1%, which is larger, the macro-bending loss is greatly increased compared with the cases of the corresponding ninth, eleventh, and thirteenth embodiment examples. In addition, by forming the refractive index profile to be a concave-type profile, the cutoff wavelength is shortened in all cases. Although the leakage loss is also increased, it is equal to or smaller than 0.01 dB/km in all the cases, which has virtually no influence on the transmission loss.

A method of manufacturing a polarization-maintaining optical-fiber connecting portion according to a third embodiment of the present invention will be explained. The method of manufacturing a polarization-maintaining optical-fiber connecting portion according to the third embodiment is for fusion splicing polarization-maintaining optical fiber according to the first embodiment and a stress-applying-type polarization-maintaining optical fiber and manufacturing a polarization-maintaining optical-fiber connecting portion.

Figure 15:
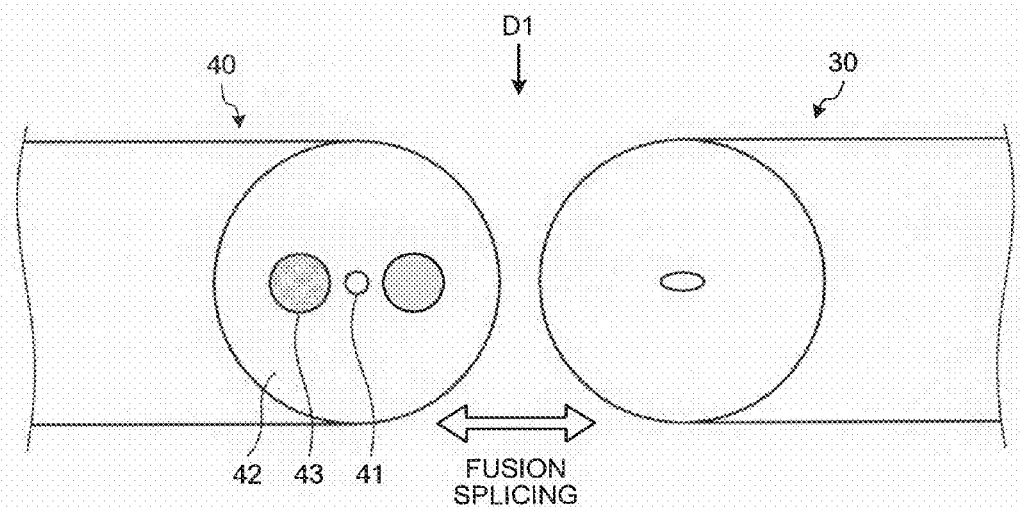
FIG. 15 is a schematic diagram for explaining a method of manufacturing a polarization-maintaining optical-fiber connecting portion according to a third embodiment of the present invention.

FIGS. 14 and 15 are schematic diagrams for explaining the method of manufacturing a polarization-maintaining optical-fiber connecting portion according to the third embodiment of the present invention. First, as shown in FIG. 14, a facet of the polarization-maintaining optical fiber 10 according to the first embodiment is subjected to a heating process, and the facet is made into an elliptic-core-type polarization-maintaining optical fiber portion 30. The elliptic-core-type polarization-maintaining optical fiber portion 30 includes an elliptic core region 31 that is obtained by making the core region 11 of the polarization-maintaining optical fiber 10 into an elliptical shape and a cladding region 32 in which the holes 13 of the cladding region 12 are completely collapsed.

Subsequently, as shown in FIG. 15, the elliptic-core-type polarization-maintaining optical fiber portion 30 and a stress-applying-type polarization-maintaining optical fiber 40 are fusion spliced using a conventional fusion splicer. The stress-applying-type polarization-maintaining optical fiber 40 includes a core region 41 made of germanium-doped silica glass and a cladding region 42 made of pure silica glass. In the cladding region 42, stress applying members 43 are arranged in opposite to each other across the core region 41. The relative refractive index difference of the core region 41 with respect to the cladding region 42 is 0.35% to 0.4%.

When performing the fusion splicing, in order to reduce the polarization crosstalk in the fusion-splicing portion, a fusion splicing is performed by matching the polarization axes of the elliptic-core-type polarization-maintaining optical fiber portion 30 and the stress-applying-type polarization-maintaining optical fiber 40. However, because there is no sign for matching the polarization axis in the elliptic-core-type polarization-maintaining optical fiber portion 30, when performing a core matching between the fibers, a light of a single polarization is input from a second facet of a first optical fiber in a state in which the first facets of the optical fibers are brought close to each other, and power of a light that passes through a space between the fibers, and is coupled to a second optical fiber and output from a second facet of the second optical fiber is monitored. When monitoring the power of the light, a polarizer of which the polarization angle is set to a direction that transmits the light of the single polarization is arranged on the second facet side of the second optical fiber, and the light passed the polarizer is monitored. Then, by rotating the second optical fiber so that the monitored power of the light becomes maximized, the polarizations of both of the fiber are matched to perform the core matching, and finally, a heating discharge splicing is performed.

Figure 16:
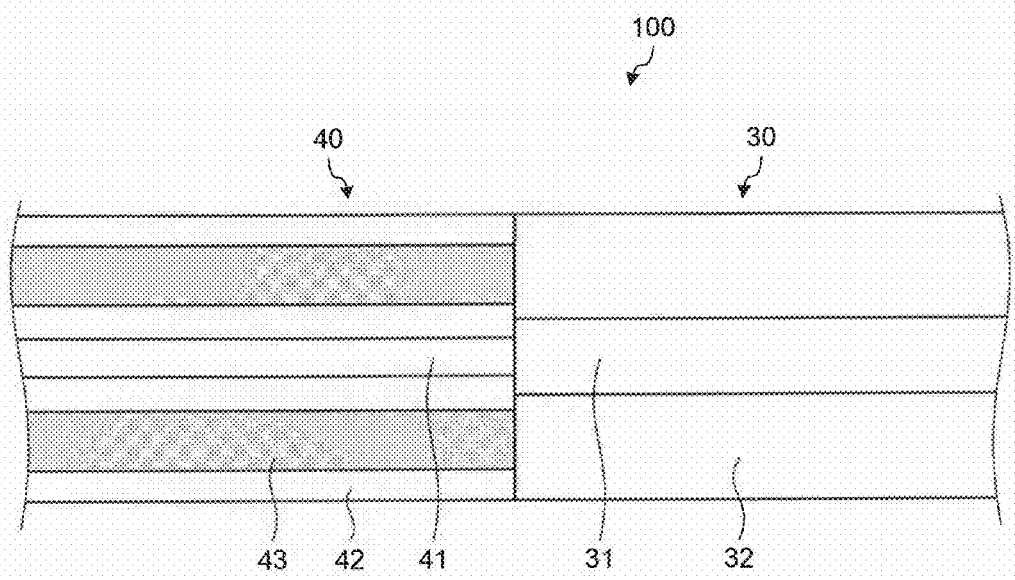
FIG. 16 is a schematic diagram illustrating a shape of a fusion-splicing portion of a manufactured polarization-maintaining optical-fiber connecting portion viewed from a direction shown in FIG. 15.

FIG. 16 is a schematic diagram illustrating a shape of the fusion-splicing portion of a polarization-maintaining optical-fiber connecting portion 100 manufactured by performing the fusion splicing viewed from a direction D1 shown in FIG. 15. As shown in FIG. 16, in the fusion-splicing portion of the polarization-maintaining optical-fiber connecting portion 100, because the longitudinal axis direction of the elliptic core region 31 of the elliptic-core-type polarization-maintaining optical-fiber portion 30 is identical to a direction of binding the axes passing the centers of the stress applying members of the stress-applying-type polarization-maintaining optical fiber 40, the polarization crosstalk of the fusion-splicing portion is decreased. As for the characteristics of the fusion-splicing portion, the polarization crosstalk is equal to or smaller than −30 dB, which is enough in the practical usage as long as the connection loss is equal to or smaller than 1.0 dB. However, when the polarization-maintaining optical-fiber connecting portion 100 is used as a nonlinear optical fiber for which a variation of the polarization state of a light is small and a high optical power is required, it is desirable that the polarization crosstalk should be equal to or smaller than −35 dB and the connection loss should be 0.5 dB. When a polarization-maintaining optical-fiber connecting portion is fabricated following the third embodiment using the polarization-maintaining optical fiber according to the first embodiment example and a typical stress-applying-type polarization-maintaining optical fiber, the polarization crosstalk in the fusion-splicing portion is −35.2 dB and the connection loss is 0.35 dB.

A method of manufacturing a polarization-maintaining optical-fiber connecting portion according to a fourth embodiment of the present invention will be explained. Unlike the third embodiment, the method of manufacturing a polarization-maintaining optical-fiber connecting portion according to the fourth embodiment of the present invention is for making the core region into an elliptical shape by matching polarization axes of the polarization-maintaining optical fiber according to the first embodiment and the stress-applying-type polarization-maintaining optical fiber, performing a fusion splicing in such a manner that the holes at the facet of the polarization-maintaining optical-fiber are not collapsed, and heating the facet of the fusion-spliced polarization-maintaining optical-fiber so that the holes are collapsed.

Figure 17:
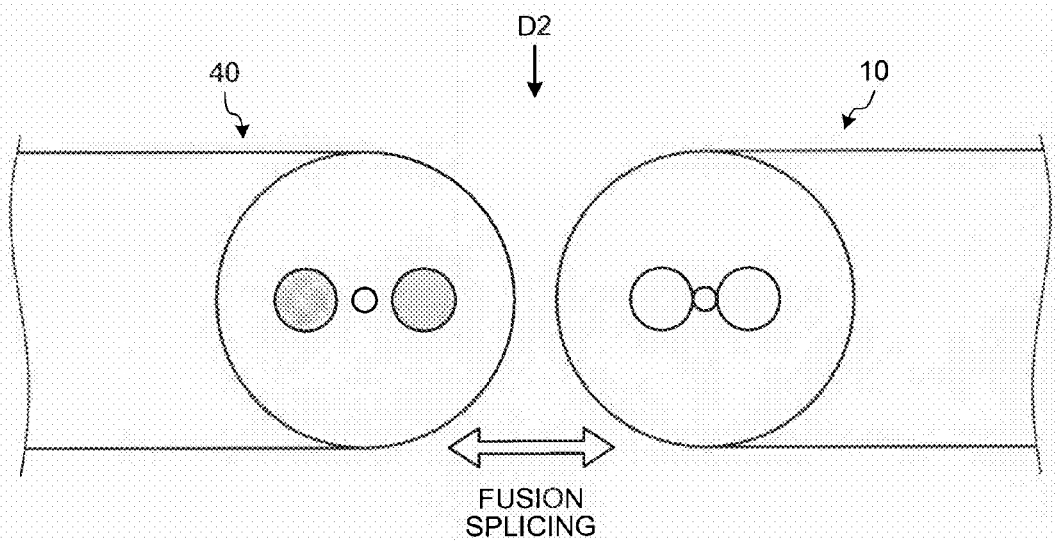
FIG. 17 is a schematic diagram for explaining a method of manufacturing a polarization-maintaining optical-fiber connecting portion according to a fourth embodiment of the present invention.

FIG. 17 is a schematic diagram for explaining the method of manufacturing a polarization-maintaining optical-fiber connecting portion according to the fourth embodiment. First, as shown in FIG. 17, the polarization-maintaining optical fiber 10 and the stress-applying-type polarization-maintaining optical fiber 40 are fusion spliced using a conventional fusion splicer in a state in which the polarization axes are matched. In this case, because the holes 13 formed in the polarization-maintaining optical-fiber 10 become marks for matching the polarization axes, it is possible to match the polarization axes by performing the core matching using an image processing function of the conventional fusion splicer in such a manner that the arrangement direction of the holes 13 of the polarization-maintaining optical fiber 10 becomes identical to the arrangement direction of the stress applying members 43 of the stress-applying-type polarization-maintaining optical fiber 40. The fusion splicing is performed with a discharge intensity of a level with which the holes 13 are not collapsed at the facet of the polarization-maintaining optical fiber 10.

Figure 18:
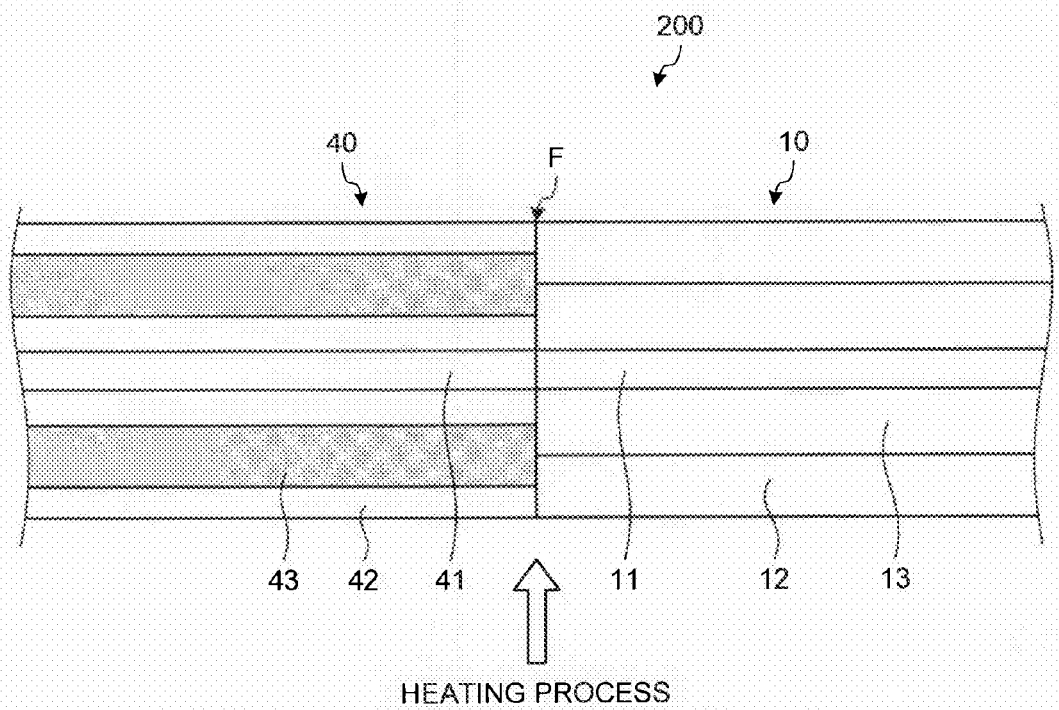
FIG. 18 is a schematic diagram illustrating a shape of a fusion-splicing portion of a manufactured polarization-maintaining optical-fiber connecting portion viewed from a direction shown in FIG. 17.

FIG. 18 is a schematic diagram illustrating a shape of a fusion-splicing portion of a polarization-maintaining optical-fiber connecting portion 200 manufactured by performing the fusion splicing viewed from a direction D2 shown in FIG. 17. As shown in FIG. 18, in the fusion splicing portion of the polarization-maintaining optical-fiber connecting portion 200, because a direction of binding the axes passing the centers of the holes 13 of the polarization-maintaining optical fiber 10 is identical to a direction binding the axes passing the centers of the stress applying members 43 of the stress-applying-type polarization-maintaining optical fiber 40, the polarization crosstalk of the fusion-splicing portion is decreased.

In the fourth embodiment, in the state shown in FIG. 18, the holes 13 are completely collapsed and the core region 11 is made into an elliptical shape by further performing a heating process or a repetition of discharge on the fusion-splicing portion F, to fabricate a desired polarization-maintaining optical-fiber connecting portion. According to the manufacturing method of the fourth embodiment, a good polarization crosstalk is obtained from the fusion splicing by the first discharge, and furthermore, an extremely low connection loss can be obtained from the repetition of discharge or the like thereafter. For example, comparing with the method of the third embodiment, because a deformation of the core region is suppressed at the case of collapsing the holes, the connection loss equal to or smaller than 0.5 dB can be easily obtained when the polarization crosstalk is equal to or smaller than −30 dB, and furthermore, the connection loss equal to or smaller than 0.3 dB can be easily obtained when the polarization crosstalk is equal to or smaller than −35 dB. When a polarization-maintaining optical-fiber connecting portion is fabricated following the fourth embodiment using the polarization-maintaining optical fiber according to the first embodiment example and a typical stress-applying-type polarization-maintaining optical fiber, the polarization crosstalk in the fusion-splicing portion is −36 dB and the connection loss is 0.2 dB.

Furthermore, a polarization-maintaining optical-fiber connecting portion has been fabricated following the fourth embodiment using the polarization-maintaining optical fiber according to the first embodiment example and a highly nonlinear stress-applying-type polarization-maintaining optical fiber having the mode field diameter of 4.3 µm at the wavelength of 1550 nm, the nonlinear coefficient of 12/w/m, and the polarization crosstalk of 40 dB/m. Although the stress-applying-type polarization-maintaining optical fiber has an extremely small core diameter compared with the polarization-maintaining optical fiber according to the first embodiment example and there is a larger mode field mismatch occurring at the fusion-splicing portion, the polarization crosstalk at the fusion-splicing portion is −35.5 dB, and the connection loss is 0.4 dB, which are acceptable values.

As described above, according to an aspect of the present invention, the refractive index profile of the core region is either one of a step shaped or a concave shaped, and the cladding region includes two holes formed in such a manner that a shortest distance from the core region is virtually zero at locations in opposite to each other across the core region, and therefore there is an effect of realizing a side-tunnel-type polarization-maintaining optical fiber with a superior polarization maintaining property and a reduced transmission loss.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:
1. A polarization-maintaining optical fiber comprising:
a core region; and
a cladding region formed around the core region, the cladding region having a refractive index lower than a refractive index of the core region, wherein
a refractive index profile of the core region is either one of a step shaped or a concave shaped, and
the cladding region includes two holes formed in such a manner that a shortest distance W between the core region and a hole represented by W=L−(a+b)/2 is −0.1 µm to 0.2 µm, where L is a distance between centers of the core region and the hole, a is a core diameter of the core region, and b is a diameter of the hole, at locations in opposite to each other across the core region, the cladding region, except the two holes, is formed of a uniform material, a relation $a \geq -24.221 \times \Delta^3 + 51.718 \times \Delta^2 - 40.786 \times \Delta + 16.878$ is satisfied and $\Delta$ is equal to or larger than 0.32%, where $\Delta$ is a relative refractive index difference in percent of the core region with respect to the cladding region, and a is a core diameter in μm of the core region, noncircularity of the core region is smaller than 10%, and a leakage loss at a wavelength of 1550 nm is 0.01 dB/km or less.

2. The polarization-maintaining optical fiber according to claim 1, wherein when a shape of the refractive index profile of the core region from a point where a relative refractive index difference with respect to the cladding region is zero to a point where the relative refractive index difference is three quarters of a maximum relative refractive index difference is approximated by an refractive index profile at a boundary between the core region and the cladding region, the refractive index profile of the core region has a shape in which an a value is equal to or larger than 3.5.

3. The polarization-maintaining optical fiber according to claim 1, wherein the core region is formed with germanium-doped silica glass, and the cladding region is formed with pure silica glass.

4. The polarization-maintaining optical fiber according to claim 1, wherein modal birefringence is equal to or larger than $1.0 \times 10^{-4}$.

5. The polarization-maintaining optical fiber according to claim 1, wherein modal birefringence is equal to or larger than $2.0 \times 10^{-4}$.

6. The polarization-maintaining optical fiber according to claim 1, wherein the polarization-maintaining optical fiber operates in single mode at a wavelength equal to or longer than 1310 nanometers.

7. The polarization-maintaining optical fiber according to claim 1, wherein the polarization-maintaining optical fiber operates in single mode at a wavelength equal to or longer than 1500 nanometers.

8. The polarization-maintaining optical fiber according to claim 1, wherein a macro-bending loss at a wavelength of 1550 when a bending is formed with a curvature radius of 10 millimeters is equal to or smaller than 0.1 dB/m.

9. A method of manufacturing a polarization-maintaining optical-fiber connecting portion comprising:

forming an elliptic core region at a facet of a polarization-maintaining optical fiber that includes a core region and a cladding region formed around the core region, the cladding region having a refractive index lower than a refractive index of the core region, wherein a refractive index profile of the core region is either one of a step shaped or a concave shaped, and the cladding region includes two holes formed in such a manner that a shortest distance W between the core region and a hole represented by $W = L - (a+b)/2$ is −0.1 μm to 0.2 μm, where L is a distance between centers of the core region and the hole, a is a core diameter of the core region, and b is a diameter of the hole, at locations in opposite to each other across the core region, by collapsing the holes at the facet, wherein a relation $a \geq -24.221 \times \Delta^3 + 51.718 \times \Delta^2 - 40.786 \times \Delta + 16.878$ is satisfied and $\Delta$ is equal to or larger than 0.32%, where $\Delta$ is a relative refractive index difference in percent of the core region with respect to the cladding region, and a is a core diameter in μm of the core region, noncircularity of the core region is smaller than 10% a leakage loss at a wavelength of 1550 nm is 0.01 dB/km or less, and the cladding region, except the two holes, is formed of a uniform material; and fusion splicing the polarization-maintaining optical fiber and a stress-applying polarization-maintaining optical fiber after aligning polarization axes of the elliptic core region and the stress-applying polarization-maintaining optical fiber.

10. A method of manufacturing a polarization-maintaining optical-fiber connecting portion comprising:

fusion splicing a polarization-maintaining optical fiber that includes a core region and a cladding region formed around the core region, the cladding region having a refractive index lower than a refractive index of the core region, wherein a refractive index profile of the core region is either one of a step shaped or a concave shaped, and the cladding region includes two holes formed in such a manner that a shortest distance W between the core region and a hole represented by $W = L - (a+b)/2$ is −0.1 μm to 0.2 μm, where L is a distance between centers of the core region and the hole, a is a core diameter of the core region, and b is a diameter of the hole, at locations in opposite to each other across the core region, and a stress-applying polarization-maintaining optical fiber after aligning polarization axes of the polarization-maintaining optical fiber and the stress-applying polarization-maintaining optical fiber in such a manner that the holes at a facet of the polarization-maintaining optical fiber are not collapsed, wherein a relation $a \geq -24.221 \times \Delta^3 + 51.718 \times \Delta^2 - 40.786 \times \Delta + 16.878$ is satisfied and $\Delta$ is equal to or larger than 0.32%, where $\Delta$ is a relative refractive index difference in percent of the core region with respect to the cladding region, and a is a core diameter in μm of the core region, and noncircularity of the core region is smaller than 10%, a leakage loss at a wavelength of 1550 nm is 0.01 dB/km or less, and the cladding region, except the two holes, is formed of a uniform material; and forming an elliptic core region at the facet by heating the facet of the fusion spliced polarization-maintaining optical fiber so that the holes are collapsed.

11. A polarization-maintaining optical-fiber connecting portion manufactured by a method comprising:

forming an elliptic core region at a facet of a polarization-maintaining optical fiber that includes a core region and a cladding region formed around the core region, the cladding region having a refractive index lower than a refractive index of the core region, wherein a refractive index profile of the core region is either one of a step shaped or a concave shaped, and the cladding region includes two holes formed in such a manner that a shortest distance W between the core region and a hole represented by $W = L - (a+b)/2$ is −0.1 μm to 0.2 μm, where L is a distance between centers of the core region and the hole, a is a core diameter of the core region, and b is a diameter of the hole, at locations in opposite to each other across the core region, by collapsing the holes at the facet, wherein a relation $a \geq -24.221 \times \Delta^3 + 51.718 \times \Delta^2 - 40.786 \times \Delta + 16.878$ is satisfied and $\Delta$ is equal to or larger than 0.32%, where $\Delta$ is a relative refractive index difference in percent of the core region with respect to the cladding region, and a is a core diameter in μm of the core region, and noncircularity of the core region is smaller than 10% a leakage loss at a wavelength of 1550 nm is 0.01 dB/km or less, and the cladding region, except the two holes, is formed of a uniform material; and fusion splicing the polarization-maintaining optical fiber and a stress-applying polarization-maintaining optical fiber after aligning polarization axes of the elliptic core region and the stress-applying polarization-maintaining optical fiber, wherein in a fusion-splicing portion, a polarization crosstalk is equal to or smaller than −30 dB, and a connection loss is equal to or smaller than 1.0 dB.

12. The polarization-maintaining optical-fiber connecting portion according to claim 11, wherein in the fusion-splicing portion, the polarization crosstalk is equal to or smaller than −35 dB, and the connection loss is equal to or smaller than 0.5 dB.

13. The polarization-maintaining optical-fiber connecting portion according to claim 11, wherein a direction of a major axis of the elliptic core region formed at the facet of the polarization-maintaining optical fiber matches with a direction connecting axes that pass centers of two stress applying members of the stress-applying polarization-maintaining optical fiber.

14. The polarization-maintaining optical-fiber connecting portion according to claim 11, wherein a nonlinear coefficient of the stress-applying polarization-maintaining optical fiber is equal to or larger than 10/w/m.

15. A polarization-maintaining optical-fiber connecting portion manufactured by a method comprising:

forming an elliptic core region at a facet of a polarization-maintaining optical fiber that includes a core region and a cladding region formed around the core region, the cladding region having a refractive index lower than a refractive index of the core region, wherein a refractive index profile of the core region is either one of a step shaped or a concave shaped, and the cladding region includes two holes formed in such a manner that a shortest distance W between the core region and a hole represented by W=L−(a+b)/2 is −0.1 μm to 0.2 μm where L is a distance between centers of the core region and the hole, a is a core diameter of the core region, and b is a diameter of the hole, at locations in opposite to each other across the core region, by collapsing the holes at the facet, wherein a relation a $\geqq -24.221 \times \Delta^3 + 51.718 \times \Delta^2 - 40.786 \times \Delta + 16.878$ is satisfied and A is equal to or larger than 0.32%, where Δ is a relative refractive index difference in percent of the core region with respect to the cladding region, and a is a core diameter in μm of the core region, and noncircularity of the core region is smaller than 10%, a leakage loss at a wavelength of 1550 nm is 0.01 dB/km or less, and the cladding region, except the two holes, is formed of a uniform material; and fusion splicing the polarization-maintaining optical fiber and a stress-applying polarization-maintaining optical fiber after aligning polarization axes of the elliptic core region and the stress-applying polarization-maintaining optical fiber, wherein in a fusion-splicing portion, a polarization crosstalk is equal to or smaller than −30 dB, and a connection loss is equal to or smaller than 0.5 dB.

16. The polarization-maintaining optical-fiber connecting portion according to claim 15, wherein in the fusion-splicing portion, the polarization crosstalk is equal to or smaller than −35 dB, and the connection loss is equal to or smaller than 0.3 dB.

17. The polarization-maintaining optical-fiber connecting portion according to claim 15, wherein a direction of a major axis of the elliptic core region formed at the facet of the polarization-maintaining optical fiber matches with a direction connecting axes that pass centers of two stress applying members of the stress-applying polarization-maintaining optical fiber.

18. The polarization-maintaining optical-fiber connecting portion according to claim 15, wherein a nonlinear coefficient of the stress-applying polarization-maintaining optical fiber is equal to or larger than 10/w/m.

* * * * *